Feb. 17, 1953     V. P. MATHEWS     2,628,721

GASOLINE FILTER

Filed Nov. 23, 1949

INVENTOR
VERNER P. MATHEWS
BY Willits, Hardman & Fehr
his ATTORNEYS

Patented Feb. 17, 1953

2,628,721

UNITED STATES PATENT OFFICE 2,628,721
GASOLINE FILTER

Verner P. Mathews, Dayton, Ohio, assignor to General Motors Corporation, Detroit, Mich., a corporation of Delaware Application November 23, 1949, Serial No. 129,084

6 Claims. (Cl. 210—165)

This invention relates to filters and is particularly directed to fluid fuel filters such as are used in connection with internal combustion engines.

It is a primary object of the invention to provide a unitary filter for use with liquid fuels used in connection with internal combustion engines, for example, automotive engines.

In carrying out the above object, it is a further object to provide a unitary gasoline filter for use in connection with fuel lines and the like for eliminating extraneous particles of dirt and also for acting as a fluid separator whereby water or other immiscible liquids in the gasoline are separated therefrom prior to passage of gasoline into the carburetor and engine thereof.

A still further object of the invention is to provide a method for assembling a filter wherein the inherent porosity of the filter element is utilized to form a seal with a gasket whereby the entire filter may be assembled in a simple stamping or spinning operation.

Further objects and advantages of the present invention will be apparent from the following description, reference being had to the accompanying drawing, wherein a preferred embodiment of the present invention is clearly shown.

Fluid filters, particularly filters used for fuel oils, such as gasoline, etc., are often used in connection with internal combustion engines, first to remove extraneous dirt from the fuel and second to separate immiscible liquids, such as water, from the fuel. In this manner, the fuel delivered to the carburetor or other distribution device is free of detrimental substances whereby the efficiency and operation of the engine is improved.

Figure 1:
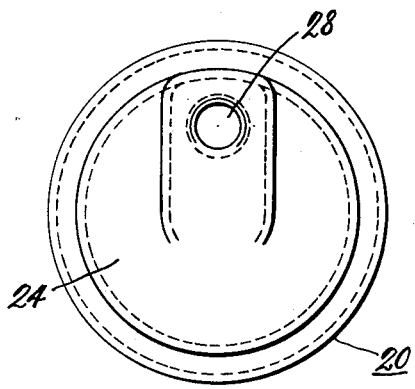
Fig. 1 is a view of one side of the gasoline filter.
Figure 2:
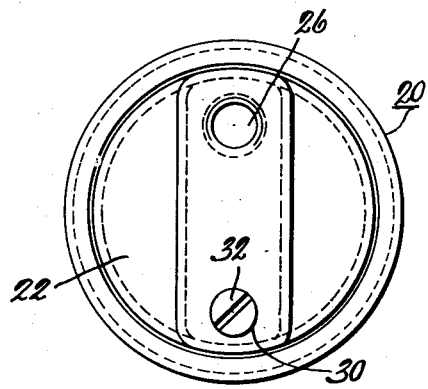
Fig. 2 is an opposite view thereof.
Figure 3:
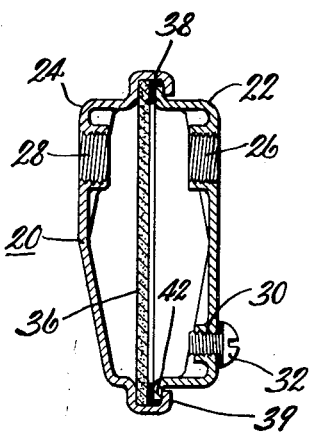
Fig. 3 is a sectional view of the filter shown in Figs. 1 and 2.

Specifically referring to the drawings, an improved type of gasoline filter is shown at 20 in Fig. 1, which filter is made from two generally cup-shaped telescopic stampings 22 and 24 which have threaded inlet and outlet openings 26 and 28 respectively. Stamping 22 also includes a threaded drain 30 closed by a screw 32. This screw may be removed periodically to permit the draining out of water, particles of dirt, etc. Interposed between the two stamped cup portions 22 and 24 is a disc filter 36 preferably formed from porous metal wherein metal powders are sintered together in the substantially non-compacted condition to form a highly porous membrane. The materials used in the filter element may be prealloyed metal powders wherein two metals are present in each particle of powder or they may be mixtures of metal powders, etc. Specific details regarding the manufacture of porous metal membranes of this character are clearly shown and described in Koehring Patent No. 2,198,702, Olt Patent No. 2,273,589 and Davis Patent No. 2,157,596, all assigned to the assignee of this invention. The method of manufacture of the porous metal membranes forms no part of the present invention.

Figure 4:
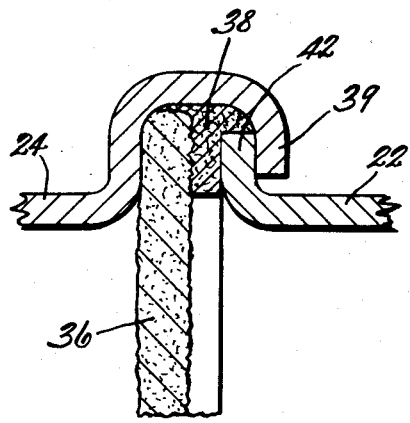
Fig. 4 is an enlarged, fragmentary, sectional view of a portion of the periphery of the filter showing specifically the assembly thereof.

In the assembly of the device, the cup-shaped stamping 24 is assembled with the filter element 36 and a gasket 38 is placed around the periphery of the element 36 and the second cup member 22 is placed thereon. The assembly is then placed in a punch press so that two telescopically engaged stampings 22 and 24 with the porous metal disc 36 and the gasket 38 is held in place. The press is then operated to turn over the edge 39 of the cup member 24 into sealing engagement with a flange 42 on the cup member 22. The clearance between edge 39 and flange 42 is important. Sufficient clearance must be present to permit the gasket to flow upwardly and completely fill the space to provide a hermetic seal. This particular construction is shown clearly in Fig. 4 wherein the gasket material has been crowded so as to fill the entire space made by the clearance. During this operation, the gasket 38 is pressed into the porous metal element 36 and due to the biting action thereof is prevented from slipping out of position. Simultaneously, the gasket is deformed as shown in the enlarged fragmentary sectional view Fig. 4. Actually the gasket material penetrates the porous metal to a degree and also fills in around the edges thereof due to the pressure of the operation for forming a complete and adequate hermetic fluid seal.

In some cases instead of a punch press operation for the assembly of parts, it may be desirable to spin the edge 39 over the flange 42 but in either case the sealing action is obtained due to the specific cooperation between the relatively soft gasket material 38 and the relatively rough, hard and porous filter material 36.

The gasket may be fabricated from cork, felted paper and cork, fiber, resilient plastic material or any other suitably deformable material such as lead, aluminum, synthetic rubber-like compositions, etc., which is not acted upon deleteriously by the fuel and this specific material does not form a portion of this invention.

The porous filter material may be bronze, iron, nickel-copper alloy, copper-iron or any of the usual metals used in powder metallurgy or which may be bronze or some other metal which has had the entire surface thereof plated with another metal. For example, it is highly desirable if bronze is utilized to plate the bronze completely through with tin which minimizes and in most cases, prevents any catalytic action between the bronze and fuel. I have found that tin plate is particularly desirable when the filter is to be used in connection with gasoline.

The separator action of the filter whereby water or other immiscible liquids in small quantities are separated from the fuel may be explained by the principles set forth in the Reinsch Patent No. 2,359,386 wherein porous metal is provided in a fluid separator.

While the embodiment of the present invention as herein disclosed, constitutes a preferred form, it is to be understood that other forms might be adopted.

What is claimed is as follows:

1. A fluid filtering device, comprising, a pair of generally circular cup-shaped members each having an aperture disposed adjacent the edge thereof, one of said members including a flat outwardly extending flange therearound, the other of said members including an outwardly extending stepped flange therearound, the stepped portion thereof being of greater depth than the thickness of the flat flange and having an inner diameter greater than the outer diameter of said flat flange, so as to provide an annular gap between the edge of the flat flange and the inner wall of the stepped flange when said members are assembled in telescopic relation with their respective apertures aligned, a sintered highly porous metal filter element of greater diameter than the flat flange and of less diameter than the inner diameter of the cup flange between said members, an annular resilient fluid impervious gasket interposed between said filter element and the flat flange, said gasket having a free diameter substantially equal to the inner diameter of the stepped flange, said gasket sealing the members and the element into a unit and completely filling said annular gap and the space between the wall of the stepped flange and the element when the stepped flange is turned over the flat flange in assembly of the device, and a removable drain plug threaded into an outlet in one of said members, said outlet being adjacent the edge thereof, spaced from the aperture in said member, said outlet and said aperture being spaced equidistant from the center of the device and aligned so as to define a straight line through the center of the device.

2. A filter element as claimed in claim 1 wherein said porous metal element is tin-plated bronze.

3. A filter element as claimed in claim 1, wherein said porous metal element is a nickel copper alloy.

4. A filter element as claimed in claim 1, wherein said porous metal element is copper iron.

5. A filter element as claimed in claim 1, wherein said porous metal element is bronze.

6. A filter element as claimed in claim 1, wherein said porous metal element is tin-plated.

VERNER P. MATHEWS.

REFERENCES CITED

The following references are of record in the file of this patent:

UNITED STATES PATENTS

| Number | Name | Date |
|---|---|---|
| 622,217 | Fuller et al. | Apr. 4, 1899 |
| 737,971 | Sexton | Sept. 1, 1903 |
| 1,522,630 | Ireland | Jan. 13, 1925 |
| 2,202,403 | Sandberg | May 28, 1940 |
| 2,273,589 | Olt | Feb. 17, 1942 |